US011011789B2

(12) United States Patent
Guo et al.

(10) Patent No.: US 11,011,789 B2
(45) Date of Patent: May 18, 2021

(54) PACKAGE SEALING STRUCTURE, PREPARATION METHOD THEREOF AND FLEXIBLE PACKAGING BATTERY

(71) Applicant: Ningde Amperex Technology Limited, Fujian (CN)

(72) Inventors: Peipei Guo, Fujian (CN); Ping He, Fujian (CN); Yi Zhao, Fujian (CN); Yejun Peng, Fujian (CN); Wenqiang Cheng, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 124 days.

(21) Appl. No.: 16/157,181

(22) Filed: Oct. 11, 2018

(65) Prior Publication Data

US 2019/0044108 A1 Feb. 7, 2019

Related U.S. Application Data

(63) Continuation of application No. PCT/CN2016/078950, filed on Apr. 11, 2016.

(51) Int. Cl.
*H01M 50/183* (2021.01)
*H01M 50/116* (2021.01)
(Continued)

(52) U.S. Cl.
CPC ....... *H01M 50/183* (2021.01); *H01M 10/058* (2013.01); *H01M 50/116* (2021.01); *H01M 50/124* (2021.01); *H01M 50/543* (2021.01)

(58) Field of Classification Search
CPC .... H01M 2/08; H01M 2/0275; H01M 2/0285; H01M 2/0277; H01M 2/0287; H01M 10/058; H01M 2/021
(Continued)

(56) References Cited

U.S. PATENT DOCUMENTS

2012/0034510 A1* 2/2012 Kitaura ............... H01M 2/0285
429/163
2012/0288746 A1* 11/2012 Abe .................. H01M 10/0413
429/162

FOREIGN PATENT DOCUMENTS

CN 1316788 A 10/2001

OTHER PUBLICATIONS

International Search Report of PCT Patent Application No. PCT/CN2016/078950 dated Dec. 28, 2016.

* cited by examiner

*Primary Examiner* — Gary D Harris
(74) *Attorney, Agent, or Firm* — Morgan, Lewis & Bockius LLP

(57) ABSTRACT

The present application provides a package sealing structure, a preparation method thereof and a flexible packaging battery. In a package peripheral region of the package sealing structure, the insulating heat sealing layers of the two layers of packaging film face each other and are melted into one body to form an insulating fusion layer which seals and bonds the two layers of the packaging film together. The insulating fusion layer is formed with an overflow portion that overflows from the package peripheral region of the package sealing structure to the outer end surfaces of the core metal layers of the two layers of packaging film and covers completely the outer end surfaces of the core metal layer of the two layers of packaging film, so that the outer end surfaces of the core metal layers are insulated from the peripheral environment.

13 Claims, 3 Drawing Sheets

(51) Int. Cl.
  *H01M 50/124* (2021.01)
  *H01M 10/058* (2010.01)
  *H01M 50/543* (2021.01)
(58) Field of Classification Search
  USPC .......................................................... 429/127
  See application file for complete search history.

PACKAGE SEALING STRUCTURE, PREPARATION METHOD THEREOF AND FLEXIBLE PACKAGING BATTERY

CROSS REFERENCE TO RELATED APPLICATION

This application is a continuation application of International Application No. PCT/CN2016/078950 filed on Apr. 11, 2016, the entire contents of which are incorporated herein by reference.

FIELD OF THE APPLICATION

The present invention relates to the field of the battery, in particular, to a package sealing structure, a preparation method thereof and a flexible packaging battery.

BACKGROUND OF THE APPLICATION

In prior art, as shown in FIG. 1, conventional package sealing structure 1 of a battery includes two layers of packaging films 11 that are heat sealed together, each layer of packaging film 11 includes an insulating protective layer 111 located outside, an insulating heat sealing layer 112 located inside, and a core metal layer 113 laminated between the insulating protective layer 111 and the insulating heat sealing layer 112. Among them, in a package peripheral region 12 of the package sealing structure 1, the insulating heat sealing layers 112 of the two layers of packaging film 11 face each other and are melted into one body to form an insulating fusion layer 13 which seals and bonds the two layers of the packaging film 11 together. Then, the end surfaces of the corresponding core metal layers 113 of the package peripheral region 12 are pasted with an insulating adhesive S to prevent the battery from short-circuiting with the peripheral environment. However, such package sealing structure 1 is only suitable for the adhesion and covering of the sealing edge of the package peripheral region 12 which is straight. For the L-shaped or round-shaped profiled edge seal, it is difficult to achieve the adhesion and covering of the insulating adhesive S. In addition, pasting with the insulating adhesive S may increase the overall width of the cell, resulting in a loss of energy density and an increase in the material cost of the cell.

SUMMARY OF THE APPLICATION

In view of the problems in the background art, it is an object of the present invention to provide a package sealing structure, a preparation method thereof and a flexible packaging battery. The package sealing structure has a simple structure and a wide range of use, and may achieve an insulating and bonding seal for various shapes of the edge sealing, thereby improving the insulation effect of the edge of the package sealing structure and preventing short circuit from the peripheral environment.

Another object of the present invention is to provide a package sealing structure, a preparation method thereof and a flexible packaging battery. The preparation method of the packaging sealing structure is simple in operation, and improves the energy density of the cell when applied to the flexible packaging battery.

Still another object of the present invention is to provide a package sealing structure, a preparation method thereof, and a flexible package battery, which may be easily and effectively adapted to mass production, thereby reducing costs.

In order to achieve the above objects, in a first aspect, the present invention provides a package sealing structure comprising two layers of packaging films that are heat sealed together, each layer of packaging film including an insulating protective layer located outside, an insulating heat sealing layer located inside and a core metal layer laminated between the insulating protective layer and the insulating heat sealing layer. Among them, in a package peripheral region of the package sealing structure, the insulating heat sealing layers of the two layers of packaging film face each other and are melted into one body to form an insulating fusion layer which seals and bonds the two layers of the packaging film together. The insulating fusion layer is formed with an overflow portion that overflows from the package peripheral region of the package sealing structure to the outer end surfaces of the core metal layers of the two layers of packaging film and covers completely the outer end surfaces of the core metal layers of the two layers of packaging film, so that the outer end surfaces of the core metal layers of the two layers of packaging film are insulated from the peripheral environment.

In order to achieve the above objects, in a second aspect, the present invention provides a preparation method of package sealing structure for preparing the package sealing structure according to the first aspect of the present invention comprising steps of: providing a package sealing structure to be treated, the package sealing structure to be treated comprising two layers of packaging films that are heat sealed together, each layer of packaging film including an insulating protective layer located outside, an insulating heat sealing layer located inside and a core metal layer laminated between the insulating protective layer and the insulating heat sealing layer; subsequently using a hot pressing mechanism to hot press the entire package peripheral region or the partial package peripheral region of the packaging film simultaneously from the upper and lower directions of the laminated packaging film to make the portions of the upper and lower insulating heat seal layers in the package peripheral region melt into one body to form an insulating fusion layer which seals and bonds the two layers of the packaging film together; finally further hot pressing the outer edge of the package peripheral region to form an overflow portion that overflows outside the outer end surfaces of the core metal layers of the two layers of packaging film from the insulating fusion layer towards the package peripheral region of the package sealing structure and covers completely the outer end surfaces of the core metal layers of the two layers of packaging film, so that the outer end surfaces of the core metal layers of the two layers of packaging film are insulated from the peripheral environment.

In order to achieve the above objects, in a third aspect, the present invention provides a flexible package battery having the package sealing structure according to the first aspect of the present invention, the package sealing structure accommodating a cell inside.

The beneficial effect of the invention is as below:

In the package sealing structure according to the first aspect of the present invention, in the package peripheral region of the packaging seal structure, the insulating heat seal layers of the two layers of the packaging film face each other and are melted into one body to bond and seal the package peripheral region, and the overflow portion of the insulating fusion layer completely covers the outer end surfaces of the core metal layers of the two layers of packaging film, to insulate the outer end surfaces of the core metal layers of the two layers of packaging film from the peripheral environment. This simple and effective insulation improves the insulating effect and prevents short circuits from the peripheral environment. Moreover, the package sealing structure of the present invention has a simple overall structure and a wide range of use, and may achieve an insulating binding and sealing for various shapes of the edge seal.

In the preparation method according to the second aspect of the present invention, the entire package peripheral region or the partial package peripheral region of the packaging film is subjected to two hot pressing to form an overflow portion of the outer end surfaces of the core metal layers completely covering the two layers of packaging film. The preparation method is simple in operation and may increase the energy density of the cell when applied to a flexible package battery.

In the flexible packaging battery according to the present invention, by using the package sealing structure according to the first aspect of the present invention, the package sealing structure implementing the preparation method of the package sealing structure according to the second aspect of the present invention, thereby improving the energy density of the cell of the flexible packaging battery. Moreover, the flexible packaging battery of the present invention has a simple structure, is suitable for mass production, thereby reducing costs.

BRIEF DESCRIPTION OF THE ACCOMPANYING DRAWINGS

DETAILED DESCRIPTION OF THE EMBODIMENTS

Figure 1:
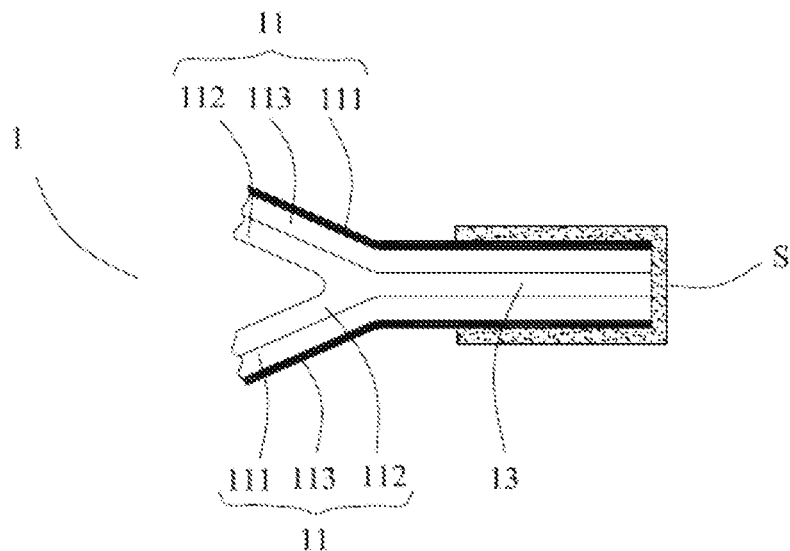
FIG. 1 is a partial view of the package sealing structure in the prior art.

The package sealing structure, the preparation method thereof and the flexible packaging battery of the present invention will be described in detail below with reference to the accompanying drawings.

First, the package sealing structure according to the first aspect of the present invention will be described.

With reference to FIGS. 2 to 5, the package sealing structure 1 according to the present invention includes two layers of packaging films 11 that are heat sealed together, each layer of packaging film 11 includes an insulating protective layer 111 located outside, an insulating heat sealing layer 112 located inside, and a core metal layer 113 laminated between the insulating protective layer 111 and the insulating heat sealing layer 112. Among them, in a package peripheral region 12 of the package sealing structure 1, the insulating heat sealing layers 112 of the two layers of packaging film 11 face each other and are melted into one body to form an insulating fusion layer 13 which seals and bonds the two layers of the packaging film 11 together. The insulating fusion layer 13 is formed with an overflow portion 131 that overflows outside the outer end surfaces 1131 of the core metal layers 113 of the two layers of packaging film 11 from the insulating fusion layer 13 towards the package peripheral region 12 of the package sealing structure 1 and covers completely the outer end surfaces 1131 of the core metal layers 113 of the two layers of packaging film 11, so that the outer end surfaces 1131 of the core metal layers 113 of the two layers of packaging film 11 are insulated from the peripheral environment.

In the package sealing structure 1 according to the present invention, in the package peripheral region 12 of the packaging seal structure 1, the insulating heat seal layers 112 of the two layers of the packaging film 11 face each other and are melted into one body to bond and seal the package peripheral region 12, and the overflow portion 131 of the insulating fusion layer 13 completely covers the outer end surfaces 1131 of the core metal layers 113 of the two layers of packaging film 11, to insulate the outer end surfaces 1131 of the core metal layers 113 of the two layers of packaging film 11 from the peripheral environment. This simple and effective insulation improves the insulating effect and prevents short circuits from the peripheral environment. Moreover, the package sealing structure of the present invention has a simple overall structure and a wide range of use, and may achieve an insulating binding and sealing for various shapes of the edge seal (such as L-shaped or round shaped profiled seal).

According to the packaging seal structure 1 of the present invention, in an embodiment, the overflow portion 131 may also cover at least a portion of the outer end surfaces 1111 of the insulating protective layers 111 of the two layers of packaging film 11, and is bonded to the insulating protective layers 111 of the two layers of packaging film 11.

Figure 3:
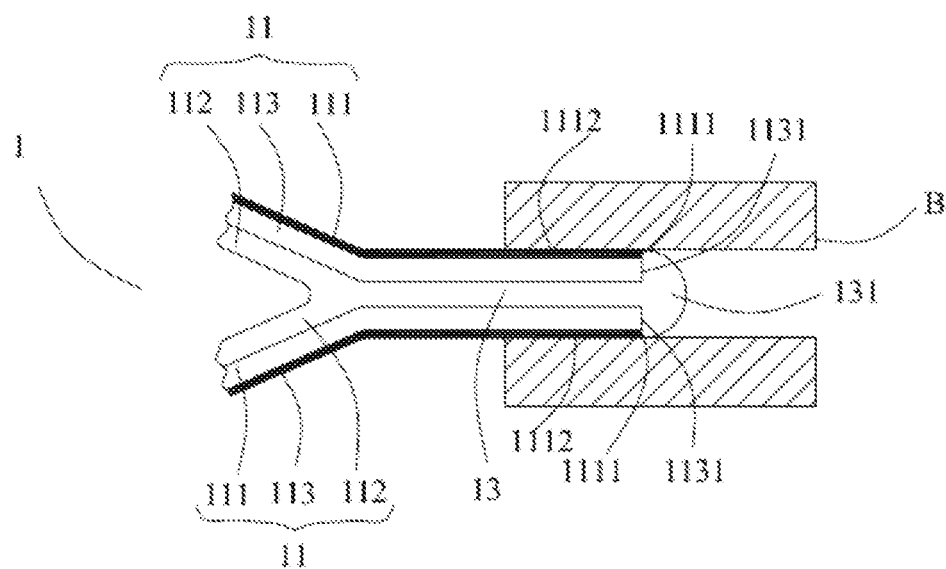
FIG. 3 is an enlarged cross-sectional view of the circled portion in FIG. 2.
Figure 4:
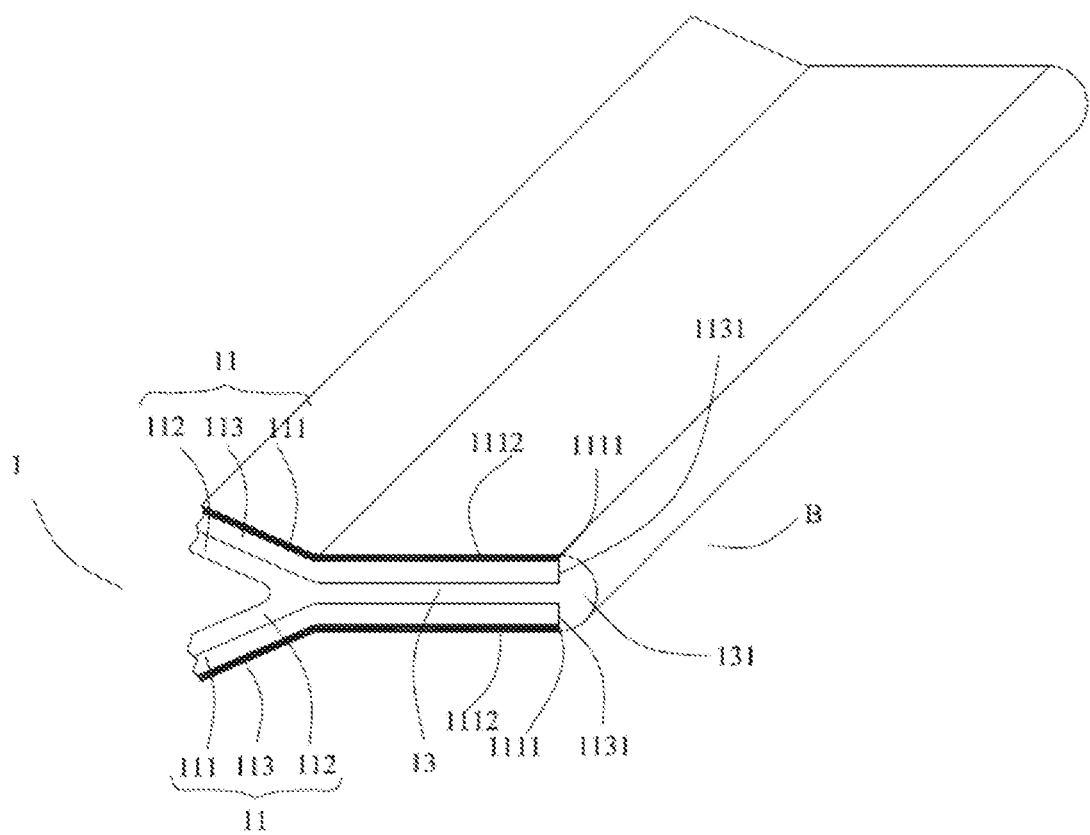
FIG. 4 is a partial perspective view of FIG. 3 with a position corresponding to a side seal portion in the package peripheral region of FIG. 2, wherein a portion corresponding to an electrode tab is a top seal portion.
Figure 5:
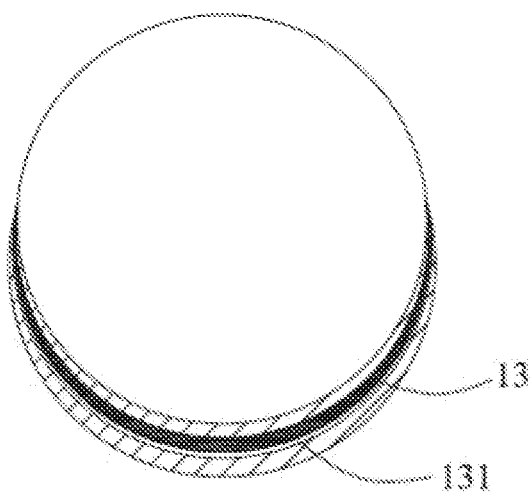
FIG. 5 is a partial view showing the application of a package sealing structure according to the present invention to a circular flexible packaging battery.

In an embodiment, with reference to FIGS. 3 to 5, the overflow portion 131 may also cover the entire outer end surfaces 1111 of the insulating protective layers 111 of the two layers of packaging film 11.

In an embodiment, the overflow portion 131 may also cover the entire outer end surfaces 1111 of the insulating protective layers 111 of the two layers of packaging film 11 and the outer surfaces 1112 in the thickness direction of the packaging film 11.

Figure 2:
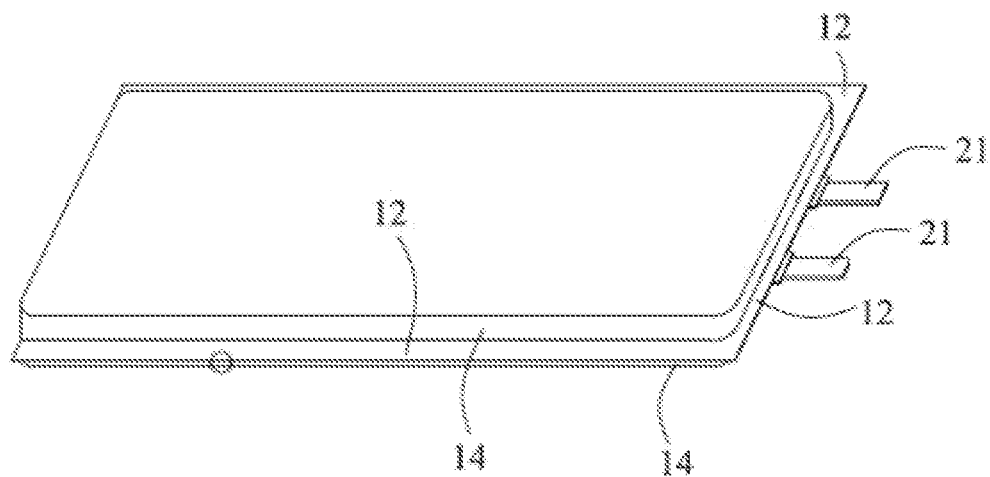
FIG. 2 is an overall view showing a package sealing structure according to the present invention applied to a square flexible packaging battery.

In an embodiment, with reference to FIG. 2, the package sealing structure 1 may further have a plurality of punching holes 14 formed in an intermediate portion of at least one of the two layers of packaging film 11.

In an embodiment, with reference to FIG. 2, the number of the punching holes 14 may be two and respectively formed in the intermediate portion of the two layers of packaging film 11. The two upper and lower punching holes 14 together accommodate a cell (not shown) when the two layers of packaging film 11 are packaged.

In an embodiment, the insulating protective layer 111 may be made of an insulating material. Further, the insulating material may be one of insulating fibers, plastics, and rubber, and is preferably insulating fibers.

In an embodiment, the insulating heat sealing layer 112 may be made of an insulating material. Further, the insulating heat sealing layer 112 may be a polymer layer.

In an embodiment, the packaging film 11 may be an aluminum plastic film. Further, the insulating protective layer 111 of the packaging film 11 may be a nylon layer, the core metal layer 113 may be an aluminum foil, and the insulating heat sealing layer 112 may be a polypropylene layer.

Secondly, the preparation method of package sealing structure 1 according to the second aspect of the present invention will be described.

Figure 6:
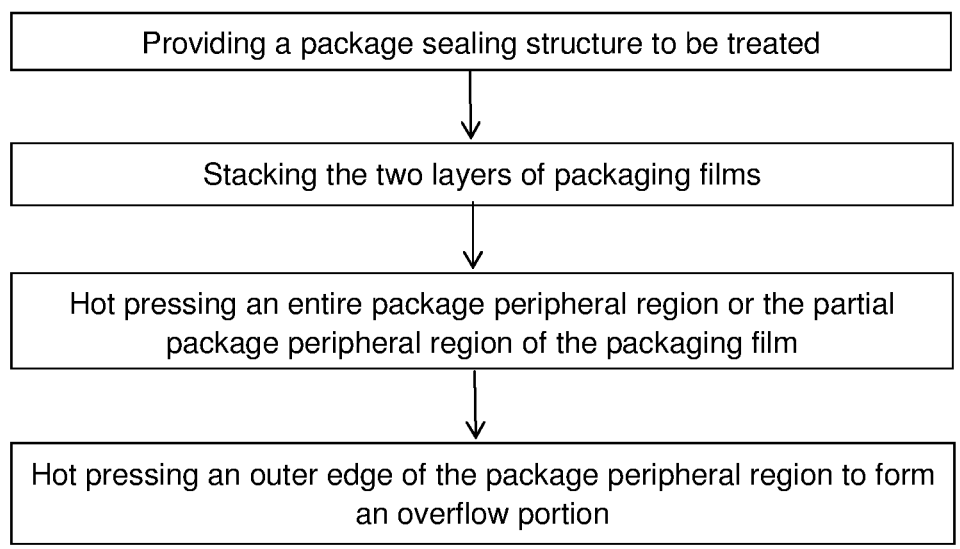
FIG. 6 is a block diagram of a preparation method of a package sealing structure.

The preparation method of package sealing structure 1 according to the second aspect of the present invention is used for preparing the package sealing structure 1 according to the first aspect of the present invention. A block diagram of the preparation method of is shown in FIG. 6. The preparation method includes the steps of:

providing a package sealing structure 1 to be treated, the package sealing structure 1 to be treated includes two layers of packaging films 11 that are heat sealed together, each layer of packaging film 11 includes an insulating protective layer 111 located outside, an insulating heat sealing layer 112 located inside and a core metal layer 113 laminated between the insulating protective layer 111 and the insulating heat sealing layer 112;

then stacking the two layers of packaging films 11, so that the insulating heat sealing layers 112 of the two layers of packaging films 11 face each other;

subsequently using a hot pressing mechanism B to hot press the entire package peripheral region 12 or the partial package peripheral region 12 of the packaging film 11 (i.e. the portion close to the cell) simultaneously from the upper and lower directions of the stacked packaging film 11 to make the portions of the upper and lower insulating heat seal layers 112 in the package peripheral region 12 melt into one body to form an insulating fusion layer 13 which seals and bonds the two layers of the packaging film 11 together;

finally further hot pressing the outer edge of the package peripheral region 12 to form an overflow portion 131 that overflows outside the outer end surfaces 1131 of the core metal layers 113 of the two layers of packaging film 11 from the insulating fusion layer 13 towards the package peripheral region 12 of the package sealing structure 1 and covers completely the outer end surfaces 1131 of the core metal layers 113 of the two layers of packaging film 11, so that the outer end surfaces 1131 of the core metal layers 113 of the two layers of packaging film 11 are insulated from the peripheral environment.

In the preparation method according to the second aspect of the present invention, the entire package peripheral region 12 or the partial package peripheral region 12 of the packaging film 11 is subjected to two hot pressings to form an overflow portion 131 of the outer end surfaces 1131 of the core metal layers 113 completely covering the two layers of packaging film 11. The preparation method is simple in operation and may increase the energy density of the cell when applied to a flexible package battery.

In the preparation method of package sealing structure according to the second aspect of the present invention, in an embodiment, when the package peripheral region 12 of the packaging film 11 is hot-pressed, the temperature of the hot pressing mechanism B may be 100 to 190° C.

In an embodiment, when the package peripheral region 12 of the packaging film 11 is hot-pressed, the pressure of the hot pressing mechanism B may be 0.02 to 0.6 MPa. In an embodiment, when the package peripheral region 12 of the packaging film 11 is hot-pressed, the hot pressing mechanism B may have a hot pressing time of 0.5 to 10 s. In an embodiment, when the outer edge of the package peripheral region 12 is further hot-pressed, the temperature of the hot pressing mechanism B may be 100 to 190° C.

In an embodiment, when the outer edge of the package peripheral region 12 is further hot-pressed, the temperature of the hot pressing mechanism B may be 0.02 to 0.6 MPa.

In an embodiment, when the outer edge of the package peripheral region 12 is further hot-pressed, the hot pressing mechanism B may have a hot pressing time of 0.5 to 10 s.

Subsequently, the flexible packaging battery according to the third aspect of the present invention will be described.

The flexible package battery according to the present invention has the package sealing structure 1 according to the first aspect of the present invention, which accommodates a cell (not shown).

In the flexible packaging battery according to the third aspect of the present invention, by using the package sealing structure 1 according to the first aspect of the present invention, and the package sealing structure 1 implementing the preparation method of the package sealing structure according to the second aspect of the present invention, the energy density of the cell of the flexible packaging battery is improved. Moreover, the flexible packaging battery of the present invention has a simple structure, is suitable for mass production, and reduces costs.

In the flexible packaging battery according to the third aspect of the present invention, in an embodiment, the flexible packaging battery may be a square flexible packaging battery or a circular flexible packaging battery. Of course, not limited to that, the flexible packaging battery may also be an irregularly shaped flexible packaging battery.

In an embodiment, the cell of the flexible packaging battery has an electrode tab R extending from the two layers of packaging film 11.

What is claimed is:

1. A package sealing structure, comprising two layers of packaging films heat sealed together, each layer of the packaging films includes:
   an insulating protective layer located outside;
   an insulating heat sealing layer located inside; and
   a core metal layer laminated between the insulating protective layer and the insulating heat sealing layer;
   wherein in a package peripheral region of the package sealing structure, the insulating heat sealing layers of the two layers of packaging films face each other and are melted into one body to form an insulating fusion layer to seal and bond the two layers of the packaging films together;
   wherein the insulating fusion layer is formed with an overflow portion overflowing outside an outer end surface of the core metal layers of the two layers of packaging films from the insulating fusion layer towards the package peripheral region of the package sealing structure and completely covers the outer end surface of the core metal layers of the two layers of packaging films, so that the outer end surface of the core metal layer of the two layers of packaging films is insulated from the peripheral environment, and
   the overflow portion further covers the entire outer end surface of the insulating protective layers of the two layers of packaging films and an outer surface of the packaging film in a thickness direction thereof.

2. The package sealing structure according to claim 1, wherein
   the overflow portion further covers at least a portion of an outer end surface of the insulating protective layers of the two layers of packaging films, and is bonded to the insulating protective layers of the two layers of packaging films.

3. The package sealing structure according to claim 1, wherein
the overflow portion further covers the entire outer end surface of the insulating protective layers of the two layers of packaging films.

4. The package sealing structure according to claim 1, wherein the package sealing structure further comprises a hole, formed in an intermediate portion of at least one of the two layers of packaging films.

5. The package sealing structure according to claim 1, wherein the package sealing structure comprises two holes respectively formed in the intermediate portion of the two layers of packaging films, and the two holes in combination accommodate a cell when the two layers of packaging films are packaged.

6. The package sealing structure according to claim 1, wherein the insulating protective layer is made of an insulating material.

7. The package sealing structure according to claim 1, wherein the insulating heat sealing layer is made of an insulating material.

8. The package sealing structure according to claim 1, wherein the insulating heat sealing layer is a polymer layer.

9. The package sealing structure according to claim 1, wherein the packaging film is an aluminum plastic film.

10. The package sealing structure according to claim 1, wherein the insulating protective layer of the packaging film is a nylon layer, the core metal layer is an aluminum foil, and the insulating heat sealing layer is a polypropylene layer.

11. A flexible packaging battery, comprising a package sealing structure, the package sealing structure accommodates a cell inside;
wherein the package sealing structure comprises two layers of packaging films heat sealed together, each layer of the packaging films includes:
an insulating protective layer located outside;
an insulating heat sealing layer located inside; and
a core metal layer laminated between the insulating protective layer and the insulating heat sealing layer;
wherein in a package peripheral region of the package sealing structure, the insulating heat sealing layers of the two layers of packaging films face each other and are melted into one body to form an insulating fusion layer to seal and bond the two layers of the packaging films together;
wherein the insulating fusion layer is formed with an overflow portion overflowing outside an outer end surface of the core metal layers of the two layers of packaging films from the insulating fusion layer towards the package peripheral region of the package sealing structure and completely covers the outer end surface of the core metal layer of the two layers of packaging films, so that the outer end surface of the core metal layer of the two layers of packaging films is insulated from the peripheral environment, and
the overflow portion further covers the entire outer end surface of the insulating protective layers of the two layers of packaging films and an outer surface of the packaging film in a thickness direction thereof.

12. The flexible packaging battery according to claim 11, wherein the flexible packaging battery is a square flexible packaging battery or a circular flexible packaging battery.

13. The flexible packaging battery according to claim 11, wherein the cell of the flexible packaging battery has an electrode tab extending from the two layers of packaging films.

* * * * *